United States Patent Office 2,903,467
Patented Sept. 8, 1959

2,903,467
PROCESS FOR THE MANUFACTURE OF POLY-HALOGENATED CARBOXYLIC ACIDS

Edgar Fischer, Frankfurt am Main, Germany, assignor to Farbwerke Hoechst Aktiengesellschaft vormals Meister Lucius & Brüning, Frankfurt am Main, Germany, a corporation of Germany No Drawing. Application October 15, 1957
Serial No. 690,205

5 Claims. (Cl. 260—408)

The present invention relates to a new process for the manufacture of polyhalogenated carboxylic acids, more particularly of polyhalogenated carboxylic acids which contain fluorine and chlorine.

Perhalogenated fluorine-containing carboxylic acids and the derivatives thereof have valuable properties, their alkali metal salts, for example, are excellent emulsifiers having a remarkable stability against oxidizing effects. The diacyl peroxides of said acids are suitable to start the polymerization of olefinic compounds.

Most of the known processes for the manufacture of fluorochlorocarboxylic acids and the derivatives thereof proceed from perhalogenated olefins having a terminal double bond. Of the numerous known processes for the manufacture of said compounds there is mentioned, for example, the process according to U.S. patent application Serial No. 525,783, now Patent No. 2,854,490. The olefins are subjected to suitable oxidizing processes. The most usual process is the oxidation with permanganate as described, for example, in U.S. patent application Serial No. 452,707, now abandoned. In the known processes, however, there are always obtained carboxylic acids containing one carbon atom less than the starting material and thus one carbon atom of the valuable fluoro-olefins is lost.

It has furthermore been proposed to prepare fluorochlorocarboxylic acids from saturated perfluorinated chloroparaffins, which may be obtained according to U.S. Patent 2,770,659 and to transform said paraffins under very energetic conditions by hydrolysis of the terminal trihalogen-methyl groups into carboxylic acids. As hydrolizing agents there have been used absolute sulfuric acid or oleum. Said agents are not effective, however, when the halogen is linked to a carbon atom having an olefinic double bond since, as is known, the halogen adheres extraordinarily firmly to its carbon atom in this case.

An important and easily accessible starting material for the manufacture of polyhalogenated carboxylic acids are oils obtained by cracking polymers of perhalogenated olefins, for example according to U.S. patent application Serial No. 525,783, which has already been mentioned. Said oils represent mixtures of olefins and saturated paraffins of different chain length. They are referred to in the following as crack oils. Said products contain about 20% of carbon, about 30% of chlorine and about 50% of fluorine and they have an average molecular weight between 400 and 1000. In order to prepare polyhalogenated carboxylic acids from crack oils it has hitherto been necessary either to treat the saturated and the unsaturated constituents separately according to different processes or first to saturate the olefins by treating them with chlorine or bromine and then to subject the reaction products together to a hydrolysis.

Now it has been found that it is possible to hydrolyze in one single step mixtures of saturated and unsaturated crack oils or telomer oils of the kind described above to obtain polyhalogenated carboxylic acids when the reaction is carried out at a raised temperature, preferably at about 150 to about 300° C., with sulfuric acid of high percentage or oleum containing up to 60% by weight of free $SO_3$ in the presence of 0.05% to 10%, preferably 0.1 to 5% by weight of nitrosylsulfuric acid calculated on $H_2SO_4$ of 100% strength. An advantageous variant of the process according to the invention consists in forming the nitrosylsulfuric acid during the reaction by adding to the reaction mixtures substances which are capable of forming nitrosylsulfuric acid with sulfuric acid of high percentage or oleum, such as practically absolute nitric acid or salts thereof, for example nitrates of the elements of main and subgroups I–III of the periodic table; particularly advantageous are the nitrates of the elements of the first main group.

The term "sulfuric acid of high percentage" indicates sulfuric acid of at least 98% strength by weight.

It has proved to be especially favorable to start the hydrolysis with a small amount of nitrosylsulfuric acid-containing or nitrosylsulfuric acid-free reaction mixture and to add the nitrogen compound only in the course of the reaction slowly and in an amount such that during the reaction at most 10% by weight of nitrosylsulfuric acid can be formed, calculated on $H_2SO_4$ of 100% strength. By this step it is possible in an especially easy manner to maintain the necessary reaction temperature during the reaction also without applying an excess pressure. In addition thereto it is likewise possible to distill off continuously the reaction products formed which have a lower boiling point, such as nitrosyl halides, for example nitrosyl chloride, nitrosyl fluoride, chlorosulfonic acid and sulfuryl chloride.

The necessary temperature at which the hydrolysis takes place with a useful velocity strongly depends on the nature of the trihalogen-methyl terminal group and the chain length of the halogen paraffin used; the longer the chain, the higher the required temperature. The most difficult reaction is the hydrolysis of a trifluoromethyl group. Said reaction takes place more easily in the case of the difluoromonochloro- and the dichloromonofluoro-methyl group. Generally the trichloro-methyl groups or the bromine-containing trihalogen-methyl groups, for example difluorobromomethyl, dichlorobromomethyl, can be reacted in the most easy manner. The chain length of the perhalogen-paraffins especially influences the reaction temperatures attainable at normal pressure.

The process according to the invention is particularly suitable for the reaction of polymers or copolymers containing simultaneously chlorine and fluorine and having an oily consistency, for example of polytrifluorochloroethylene and copolymers of trifluorochloroethylene with tetrafluoroethylene or vinylidene fluoride. The manufacture of a cotelomer of trifluorochloroethylene with tetrafluoroethylene is described in Example 4 of U.S. Patent 2,770,659. Of course it is likewise possible to use cotelomers prepared according to other processes. According to the process of the invention olefins react more rapidly than saturated compounds. The oils which have not been hydrolyzed in a reaction mixture are therefore mostly practically free from olefins.

The following examples serve to illustrate the invention, but they are not intended to limit it thereto; the parts being by weight.

Example 1

500 parts of a crack oil prepared according to Example 2 of U.S. patent application Serial No. 525,783 from polytrifluorochloroethylene with the use of the fraction which has a boiling range between 100 and 150° C. under a pressure of 1 mm. of mercury and a hydrogenation iodine number of 74 are heated with 750 parts of absolute sulfuric acid and 10 parts of kieselguhr with addition of 25 parts of nitrosylsulfuric acid for 3 hours at 210–220° C., while stirring vigorously. The reaction product is then put on ice, whereby 394 parts of a heavy organic phase separate which are composed of unreacted oil and fluorochlorocarboxylic acids. Said mixture is separated and treated with a solution of 50% strength of potassium hydroxide until the reaction remains alkaline. About 145 parts of the solution are used up. The acids which are present in the reaction mixture in a dissolved form are separated from the residual oil (148 parts) and precipitated by addition of concentrated hydrochloric acid. 240.5 parts of a mixture of crude acids are obtained, about 90% of which consist of fluorochlorocarboxylic acids, of which the greater part contain 6–10 carbon atoms and have a molecular weight of about 400–600. The impurities present are, above all, water and alkali metal salts. After the transformation into the alkali metal salts the mixture can be used without difficulties as emulsifier and yields strongly foaming solutions with water.

*Example 2*

1000 parts of a telomer oil prepared according to Example 2 of U.S. Patent 2,770,659 from trifluorochloroethylene and having a boiling range of between 100 and 150° C. under a pressure of 1 mm. of mercury and a hydrogenation iodine number of 49 are heated with 1800 parts of absolute sulfuric acid and 30 parts of kieselguhr for 3 hours at 230–240° C., while stirring vigorously. In the course of the reaction 100 parts of nitric acid of 99% strength are added dropwise.

When working up the reaction mixture, 212 parts of fluorochlorocarboxylic acid and 542 parts of unreacted oil are obtained having a hydrogenation iodine number of 7.

I claim:

1. A process for the manufacture of fluorochlorocarboxylic acids from a mixture of saturated and unsaturated fluorine- and chlorine-containing carbon compounds, which comprises hydrolyzing in a single step a member selected from the group consisting of fluorine- and chlorine-containing low molecular oils and waxes, said oils and waxes being obtained by thermal decomposition of a polymer selected from the group consisting of homo- and co-polymers of trifluorochloroethylene, and carbon-, fluorine- and chlorine-containing telomers, a part of said telomers being unsaturated, said hydrolyzing being effected at about 150° C. to 300° C. with a member selected from the group consisting of sulfuric acid of at least 98% strength and oleum containing up to 60% by weight of free $SO_3$, and in the presence of 0.05–10% by weight of nitrosyl-sulfuric acid, calculated on the amount of $H_2SO_4$ of 100% strength.

2. Process of claim 1 which comprises carrying out the hydrolysis in the presence of 0.1–5% by weight of nitrosyl-sulfuric acid, calculated on the amount of $H_2SO_4$ of 100% strength.

3. A process according to claim 1 which comprises forming the nitrosyl-sulfuric acid during the reaction by adding to the reaction mixture absolute nitric acid.

4. Process of claim 1 wherein the composition which is hydrolyzed to fluorochlorocarboxylic acids is a partially unsaturated oil fraction prepared by the cracking of polytrifluorochloroethylene and having a boiling range between 100–150° C. under a pressure of 1 mm. of mercury, hydrolysis being effected by heating said oil fraction with absolute sulfuric acid with the addition of nitrosyl-sulfuric acid at 210–220° C. while stirring vigorously, the amount of nitrosyl-sulfuric acid employed being approximately 3% by weight based on the weight of sulfuric acid.

5. Process of claim 1 wherein the composition which is hydrolyzed to a fluorochlorocarboxylic acid is a partially unsaturated telomer oil prepared from trifluorochloroethylene and having a boiling range of between 100–150° C. under a pressure of 1 mm. of mercury, hydrolysis being conducted by vigorously stirring said telomer oil with absolute sulfuric acid at 230–240° C., and with the dropwise addition of about 5% by weight based on the weight of sulfuric acid of concentrated nitric acid during the hydrolysis reaction.

References Cited in the file of this patent

UNITED STATES PATENTS

| | | |
|---|---|---|
| 2,806,865 | Barnhart et al. | Sept. 17, 1957 |
| 2,806,866 | Barnhart et al. | Sept. 17, 1957 |
| 2,806,867 | Barnhart et al. | Sept. 17, 1957 |